United States Patent [19]

Randleman

[11] Patent Number: 4,881,843

[45] Date of Patent: Nov. 21, 1989

[54] JOINT STRUCTURE

[75] Inventor: Randy J. Randleman, Cleveland, Ohio

[73] Assignee: Those Characters From Cleveland, Inc., Independence, Ohio

[21] Appl. No.: 173,141

[22] Filed: Mar. 25, 1988

[51] Int. Cl.$^4$ .............................................. F16D 3/00
[52] U.S. Cl. ........................................ 403/92; 403/96; 403/297; 403/161
[58] Field of Search ................... 403/97, 96, 161, 163, 403/297, 292, 354, 92; 446/120, 121

[56] References Cited

U.S. PATENT DOCUMENTS

| | | |
|---|---|---|
| 955,314 | 4/1910 | Borne . |
| 1,649,951 | 3/1923 | English . |
| 1,996,722 | 4/1935 | Gilbert et al. . |
| 2,826,000 | 3/1958 | Fischman . |
| 2,922,669 | 1/1960 | Hansen ............................ 403/96 |
| 3,277,601 | 10/1966 | Ryan ............................... 403/97 |
| 4,186,905 | 9/1976 | Brudy . |
| 4,361,980 | 12/1982 | Chatani ........................... 446/121 |
| 4,377,916 | 3/1983 | Komiya . |

FOREIGN PATENT DOCUMENTS 109329 6/1924 Switzerland .

OTHER PUBLICATIONS

SNAP-TOP Standoff Advertisement, Copyright 1986 by Penn Engineering & Manufacturing Corp.

Primary Examiner—Randolph A. Reese
Assistant Examiner—Carol I. Bordas
Attorney, Agent, or Firm—Calfee, Halter & Griswold

[57] ABSTRACT

A joint structure having first and second members each including parallel surfaces and a common pivot axis extending perpendicular to the surfaces. One of the surfaces includes an array of detents and the other surface includes an array of recesses. The detents and recesses have discrete angular positions in which they are engaged with each other and retain the joint members in discrete angular positions. The structure also includes a pivot pin having a base portion connected with the first joint member and an integral resilient portion extending into an opening with a recess having a cam surface which is formed in the second joint member. The pin has a central axis which defines the pivot axis for the joint members. The integral resilient portion of the pin includes a plurality of resilient fingers and a cam surface. The cam surfaces of the fingers and the recess of the opening cooperate to cause the fingers resiliently to bend toward the pivot axis when the first and second joint members are urged apart. The detents and the recesses of the parallel surfaces disengage and also urge the joint members apart when a predetermined torque is applied to the joint members. When the applied torque is less than a predetermined amount, the resilient fingers exert resilient biasing forces on the cam surface of the opening in the second joint member to urge the detents and recesses of the parallel surfaces into engagement.

20 Claims, 3 Drawing Sheets

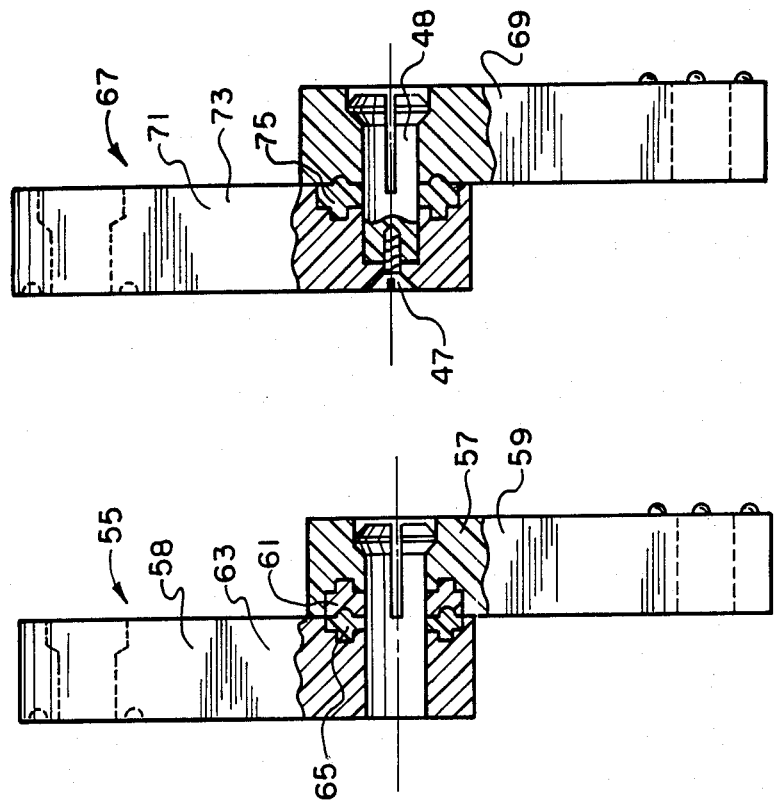
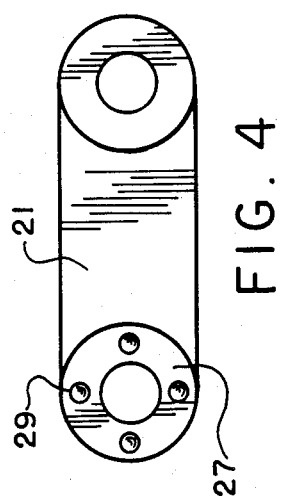
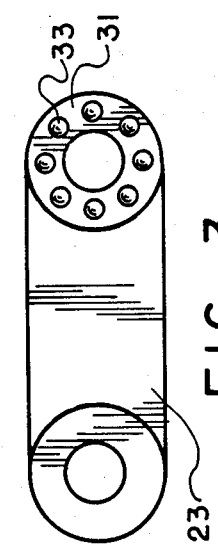
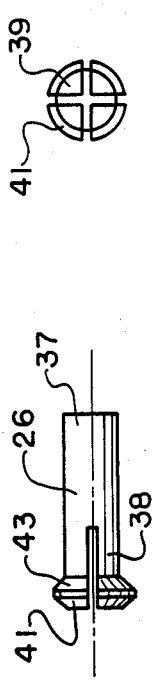

JOINT STRUCTURE

This invention relates to a joint structure. More particularly, the invention relates to a joint structure having at least two joint members connected and biased together with a pivot pin such that the joint members are capable of assuming a multitude of discrete angular positions relative to the pivot pin.

Background

The prior art provides a variety of joint structures for use in various applications. Examples of such prior art joint structures may be found in Hansen U.S. Pat. No. 2,922,669 and Brudy U.S. Pat. No. 4,186,905.

SUMMARY OF THE INVENTION

The present invention provides a new and useful joint structure which exhibits various distinct advantages over the prior art structures. Specifically, a joint structure made in accordance with the present invention when constructed with the proper materials displays good wear characteristics, may be more economical and efficient to construct than some prior art joint structures, and can be designed to be of minimal weight for applications wherein weight is of concern. Furthermore, the joint structure of the present invention comprises only a few pieces or parts, and when a certain application requires, each of these pieces may be constructed of the same material so as to produce a particular aesthetic effect.

A joint structure made in accordance with the present invention can be used in a multitude of applications. More particularly, such joint structures may serve to connect the wheels of a toy vehicle to the chassis or as a fixture for supporting and facilitating assembly such as the assembly of electronic parts and components. Additionally, such joint structures may be integrated into furniture and serve as adjustable legs and arms, or height adjustment means for table tops, lights and memo pad holders. Furthermore, the joint structure may also be used to produce measuring devices such as folding rulers and angle measuring tools. It will be appreciated that the aforementioned applications represent just a small sample of the various applications wherein a joint structure made in accordance with the present invention may be employed.

In one preferred embodiment the joint structure comprises a first and a second joint member. Each of the joint members includes a juxtaposed surface which align parallel with one another and have a common pivot axis extending perpendicular to the juxtaposed surfaces. One of the juxtaposed surfaces includes detent means and the other juxtaposed surface includes recess means. The detent and recess means provide discrete angular positions in which they are engaged with each other and retain the joint members in discrete angular positions relative to the pivot axis. Connecting the joint members and extending parallel with the pivot axis is a pivot pin. The pivot pin has a base portion connecting the two joint members and a resilient portion which extends into a recess provided in the second joint member. The recess in the second joint member includes a cam surface circumscribing the pivot axis.

The integral resilient portion of the pivot pin comprises a plurality of integral resilient fingers and a cam surface, each of which circumscribe the pivot axis. The cam of the resilient fingers and the cam surface of the recess cooperate to cause the resilient fingers resiliently to bend toward the pivot axis when the first and second joint members are urged apart. The profiles of the detent means and the recess means are designed to urge the detent and recess means out of engagement with each other and to also urge the joint members apart when a predetermined torque is applied to the joint members. When a torque is applied that is less than the predetermined amount the resilient fingers exert a resilient biasing force on the cam surface of the second joint member to urge the detent means and the recess means into engagement with each other.

The base portion of the pin may be connected to the first joint member by a variety of means including sonic shear welding, a press fit coupled with a solvent bond, or by means of a mechanical coupling such as a screw.

In many applications, preferably, the pivot pin and the joint members are made of plastic. However, any one of a variety of different materials may be utilized to construct these elements. Additionally, joint members made in accordance with the present invention may be constructed of multiple pieces. Specifically, a joint structure may comprise a primary piece and a secondary piece comprising a separate detent or recess pad. Therefore, a joint structure may be primarily composed of a low cost light weight material and the recess or detent pad may be constructed of a material which is resistent to wear.

The foregoing and other features of the invention are hereinafter more fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF DRAWINGS

FIG. 3 is side plan view of the wheel joint taken along line 3—3 of FIG. 2;

FIG. 4 a side plan view of the chasis joint taken along line 4—4 of FIG. 2;

FIG. 5 is a side plan view of one of the pivot pins illustrated in FIG 1;

FIG. 6 is an end plan view of one of the pivot pins illustrated in FIG. 1;

FIG. 7 is a side plan view with portions partially cut away of an alternative embodiment of a joint structure made in accordance with present invention;

FIG 8 a side plan view with portions partially cut away of yet another joint structure made in accordance with the present invention;

DETAILED DESCRIPTION OF THE PREFERRED EMBODIMENT

Figure 2:
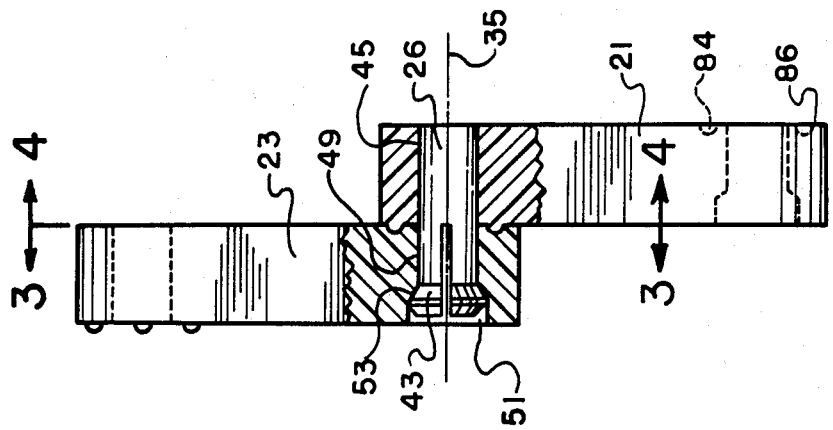
FIG. 2 is a side elevational view with portions partially cut away of the wheel joint and chasis joint illustrated in FIG. 1.

Referring to the drawings and initially to FIGS. 1-6, there is illustrated a joint structure 19 made in accordance with the present invention which is suitable for use with, for example, a toy vehicle having a mounting base 20 (the mounting base or attachment point being the only portion of the vehicle illustrated). In this particular application the joint structure 19 serves to link the wheels of the toy vehicle to the chassis.

Joint structure 19 comprises a first joint member or a chassis joint member 21, a second joint member or a wheel joint member 23, and pivot pins 25 and 26 which are identical to one another. The chassis joint member 21 and the wheel joint member 23 are preferably formed from a moldable material such as plastic. Suitable examples of such plastics include ABS (acrylo butadiene styrene) of a type commonly used in plastic toys, such as, for example, Borg-Warner ABS Type 1000 plastic. The joint members may also be made of numerous different materials, such as metal (e.g., steel), wood (e.g., hardwoods such as teak), and composites (e.g., graphite reinforced plastics). Additionally, it will be appreciated that if weight and material costs require, hollow joint members may be provided.

The chassis joint member 21 includes a surface 27 having an array of detents 29 formed therein and the wheel joint member 23 has a juxtaposed surface 31 having an array of recesses 33 formed therein. Preferably, the illustrated spherical shape detents and recesses will be employed, however, it will be appreciated that detents and recesses of any one of a variety of configurations may be utilized including, for example, pyramidal or arrow shape detents and recesses. Also, it will be appreciated that the present invention contemplates the formation of any number of detents and recesses on respective surfaces 27 and 31.

Pivot pin 26 defines a central pivot axis 35 and includes a base portion or solid portion 37 and an integral resilient portion 38 comprising an array of flexible fingers 39 surrounding the pivot axis 35. Preferably, the pivot pin 26 has four flexible fingers 39, however, two or more flexible fingers may be Provided. The fingers 39 include cam surfaces or conical segments 41 and 43 each of which extend at an acute angle of about 30 degrees to the central pivot axis 35.

The pivot pin 26 is fixedly connected with the chassis joint member 21. Specifically, the solid portion 37 is fixed in the opening 45 in the chassis joint member 21 and the flexible fingers 39 extend outwardly from the chassis joint member 21. The solid portion 37 may be fixed in the opening 45 utilizing various techniques including a sonic shear weld, a press fit coupled with a solvent bond, or by means of a mechanical coupling such as the screw 47 securing a pivot pin 48, which is somewhat shorter than pivot pins 25 and 26, as illustrated in FIG. 8.

Pivot pins 25 and 26 are preferably made of acetal plastic such as acetal plastic sold by E. I. DuPont de Nemours and Company under the trademark Delrin 500 or other comparable plastics. Additional suitable materials from which pivot pins 25 and 26 may be produced include mahogany or other comparable hardwoods, and steel or other comparable high yield strength metals. In selecting the appropriate material for constructing the pivot pins 25 and 26, it is important to keep in mind that the material selected should exhibit consistent flexibility and good wear resistance under repeated use. Also, it is important that the material selected resist a phenomenon know as "creep" (i.e., the tendency of a spring to lose some of its resiliency under prolonged stress).

The means utilized for fixing the pivot pin 26 in opening 45 will be dependent upon the type of material utilized to produce pivot pin 26. For example, when the pivot pin is constructed of acetal plastic, the mechanical fastening structure illustrated in FIG. 8 may be preferred.

Provided in the wheel joint member 23 is an opening 49 having a recess 51 which includes an annular cam surface 53 extending at an angle of preferably approximately 30 degrees relative to the axis 35. The annular cam surface 53 is designed to mate with the conical segment 43 on the flexible fingers 39 of pivot pin 26. When the joint members are positioned as illustrated in FIG. 2, the conical segments 43 on the flexible fingers 39 are resiliently biased against the annular surface 53, and exert the bias force on the joint members which retains the recesses 33 of the wheel joint member 23 in engagement with the detents 29 in the chassis joint member 21. When a predetermined torque is applied to the joint members, the profiles of the recesses 33 and the detents 29 tend to urge the juxtaposed surfaces 27 and 31 away from each other. Also, a force is applied by the annular surface 53 against the resilient fingers 39, tending resiliently to bend the fingers 39 toward the pivot axis 35 of the pivot pin 26. When the torque on the joint members is high enough, the joint members are urged apart, and the annular surface 53 on the wheel joint member 23 acts on the resilient fingers 39 and bends the resilient fingers 39 toward the central pivot axis 35 of the pivot pin 26. When the torque is reduced, the stored energy in the resilient fingers 39 exerts a force on the annular surface 53 of the wheel joint member 23 urging the detents 29 of the chassis joint member 21 towards mating engagement with the recesses 33 in the wheel joint member 23.

Figure 11:
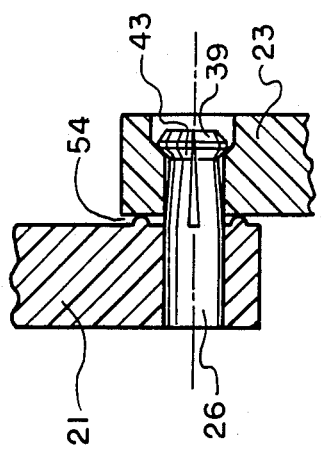
FIG 11 is a broken away partially cut away view of the joint structure illustrated in FIG. 2 when the joint members have been positioned as illustrated in FIG. 10.
Figure 9:
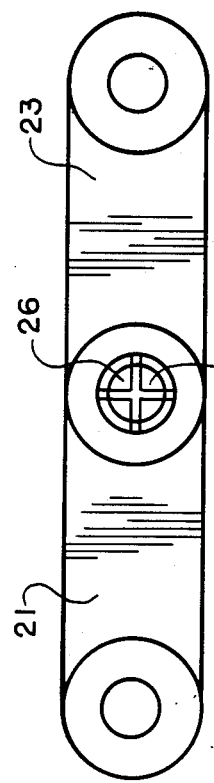
FIG. 9 is a schematic view of the joint structure illustrated in FIG. 2.
Figure 10:
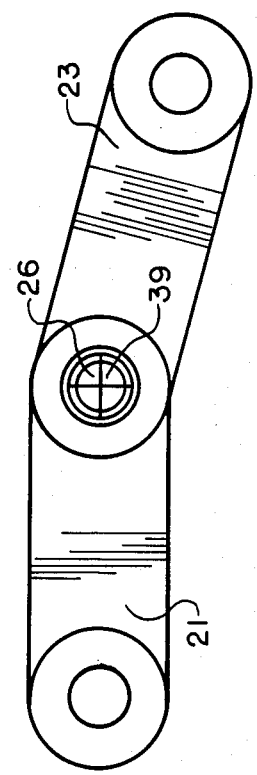
FIG. 10 is a schematic view of the joint structure illustrated in FIG. 2 with the joint members angled.

The manner in which the joint structure 19 of FIGS. 1-6 functions is illustrated schematically in FIGS. 9-11. FIG. 9 illustrates the joint members 21 and 23 in a condition in which the recesses 33 in the wheel joint member 23 are engaged with the detents 29 of the chassis joint member 21. In that condition, any torque on the joint members is not enough to disengage the detents 29 from the recesses 33. In that position, the resilient fingers 39 are urged radially outward and apply a light biasing force on the annular surface 53 of the chassis joint member 21 tending to maintain the joint members in the particular illustrated orientation. When a high enough torque is applied to the joint members, the camming action between the detents 29 and the recesses 33, and the further camming action between the annular surface 53 of the chassis joint member 21 and the conical segment 43 of the resilient fingers 39 causes the resilient fingers 39 to be deflected toward the axis 35 of the pivot pin 26 and allows a slight separation indicated generally at 54 of the joint members as shown in FIGS. 10 and 11. Concurrently therewith, there is an increase in the biasing force of the resilient fingers 39 acting against the annular surface 53.

When the torque on the joint members is reduced and the joint members are positioned in an angular orientation where the detents 29 are aligned with the recesses 33 and the resilient fingers 39 urge the joint members toward each other and cause the recesses 33 in the wheel joint member 23 to engage the detents 29 in the chassis joint member 21, the joint members are thereby adjustably retained in the angular orientation.

Referring now to FIG. 7, there is illustrated an alternative embodiment of the joint structure 55 wherein the chassis joint member 57 and the wheel joint member 58 are each constructed of two pieces. Specifically, the chassis joint member 57 includes a primary plastic piece 59 and a separate plastic recess pad 61. Similarly, wheel joint member 58 includes a primary plastic piece 63 and a secondary piece or separate plastic detent pad 65. When a joint member is formed of two pieces, the primary plastic piece may be made, for example, of an ABS plastic, and the detent pad 65 or recess pad 61 may be made, for example, of an acetal plastic so as to exploit the good wear resistance and natural lubricity of such a material. A variety of techniques may be employed to attach the recess pad 61 and detent pad 65 to their respective joint members including the aforementioned techniques discussed above for attaching the solid portion 37 of pivot pin 26 to hole 45.

It is believed that most wear on the joint members takes place on the detent members. Thus, it may be possible to produce a long wearing joint structure having a joint member wherein the recesses are produced from various different plastics, so long as the joint member with the detents comprises either (i) a member made completely of an acetal plastic, or (ii) a two piece member having a detent pad produced from an acetal plastic. This latter concept is illustrated in FIG. 8. Specifically, as shown there is a joint structure 67 comprising a one piece chassis joint member 69 and a wheel joint member 71 having a primary plastic piece 73 and a detent pad 75. It will be appreciated however that this invention also contemplates a wheel joint structure having a one piece wheel joint member and a two piece chassis joint member comprising a primary piece and a detent pad. Additionally, a single joint member may have more than one recess or detent pad.

It will be appreciated that in the joint structure 19 of FIGS. 1-6, the wheel joint member 23 and chassis joint member 21 are, in fact, identical pieces. Each includes an opening for engaging the solid portion pivot pin, another opening having a recess with an annular surface for engaging the resilient fingers of a pivot pin, both of the openings being spaced along the longitudinal axis of the joint member, and both openings circumscribing pivot axes that are parallel to each other and perpendicular to the longitudinal axis of the joint member. Also, both joint members include an integral array of recesses in one surface circumscribing one pivot axis, and an integral array of detents in a surface circumscribing the other pivot axis. Thus, both joint members can be made from a single mold, and each joint member can function as either a wheel or chassis joint member.

Figure 1:
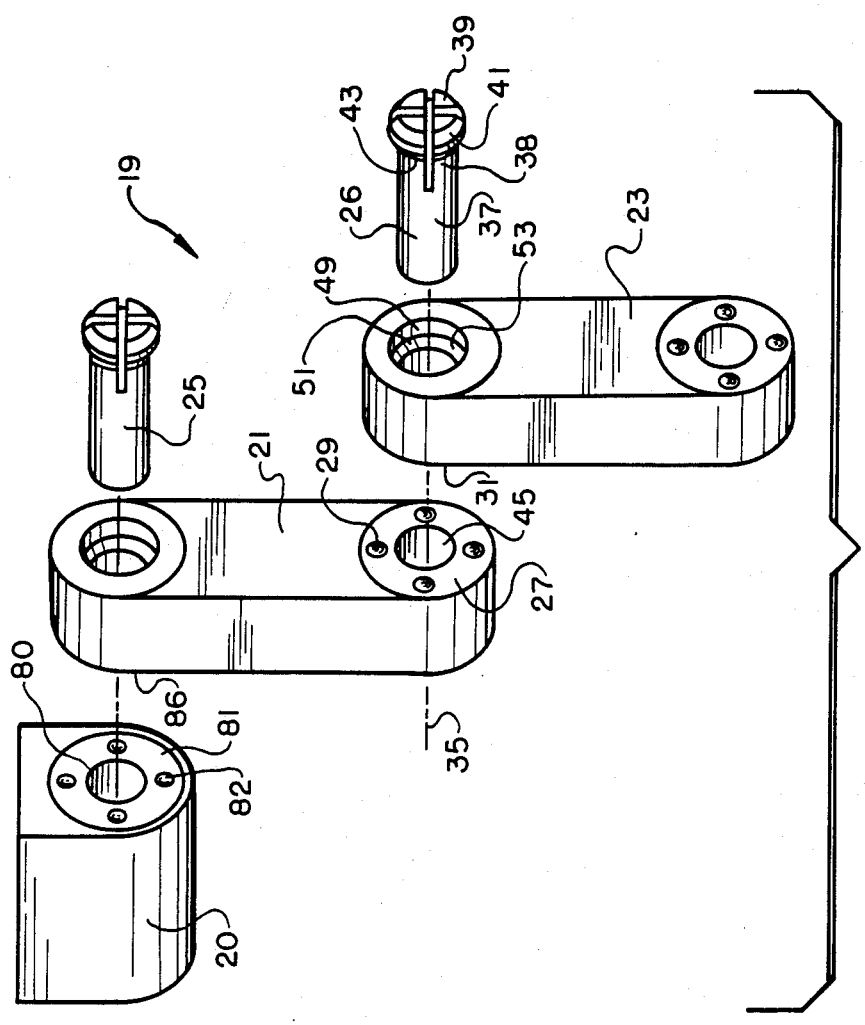
FIG. 1 is a perspective assembly view of a joint structure made in accordance with the present invention.

The mounting base 20 of the toy vehicle includes, as illustrated in FIG. 1, a hole 80 for fixedly mounting the pivot pin 25 having a juxtaposed surface 81 with an array of detents 82 for engaging the array of recesses 84 on the juxtaposed surface 86 of the chassis joint member 21. It will be appreciated that a joint structure made in accordance with the present invention may comprise any number of joint members and is in no way limited to the number of joint members which form the joint structure illustrated in FIGS. 1-11. Furthermore, it will be appreciated that a joint structure made in accordance with the present invention may only comprise a mounting base 20 and a single joint member 21. In such a case the mounting base 20 serves as a first joint member and the joint member 21 serves as a second joint member.

Accordingly, the present invention provides a joint structure with the unique ability to be adjustably retained in numerous orientations, and to retain stability in those orientations. Such a joint structure permits a toy vehicle or any other structure associated therewith to be adjustably retained in numerous angular orientations, and to retain stability in those orientations.

Although the invention has been shown and described with respect to preferred embodiments, it is obvious that equivalent alterations and modifications will occur to others skilled in the art upon the reading and understanding of the specification. The present invention includes all such equivalent alterations and modifications, and is limited only by the scope of the following claims.

I claim:

1. A joint structure comprising first and second joint members each having parallel juxtaposed surfaces and a common pivot axis extending perpendicular to said juxtaposed surfaces, one of said juxtaposed surfaces having detent means and the other of said juxtaposed surfaces having recess means, said detent and recess means having discrete angular positions in which they are engaged with each other and retain said joint members in discrete angular positions relative to said pivot axis, said second joint member having a recess, a pivot pin having a base portion connected with said first joint member and having an integral resilient portion extending into said recess of said second joint member, said pivot pin having a central axis defining the pivot axis for said joint members, the integral resilient portion of said pivot pin having two or more integral resilient fingers and a cam surface each of which circumscribe the pivot axis, the recess in said second joint member having a cam surface circumscribing the pivot axis, the cam surface of said resilient fingers and the cam surface of the recess cooperating to cause the resilient fingers resiliently to bend toward the pivot axis when said first and second joint members are urged apart, the profiles of the detent means and the recess means being designed to urge the detent and recess means out of engagement with each other and to also urge the joint members apart when a predetermined torque is applied to the joint members, and the resilient fingers exerting resilient biasing forces on the cam surface of the second joint member to urge the detent means and the recess means into engagement with each other when the applied torque is less than said predetermined amount.

2. A joint structure as defined in claim 1 wherein said first and second joint members are substantially solid plastic members.

3. A joint structure as set forth in claim 1 wherein said first and second joint members are substantially identical members, each having a longitudinal axis extending parallel to the juxtaposed surfaces, each joint member having an opening for engaging the base portion of a pivot pin and a recess for engaging the integral resilient portion of a pivot pin as defined n claim 1, said opening and said recess being spaced along the longitudinal axis of the joint member, whereby the opening in a joint member can function to engage the base of a pin in a first joint structure according to claim 1 and the recess in the joint member can function to engage the resilient portion of a second pin in a second joint structure according to claim 1.

4. A joint structure as set forth in any one of claims 1-3 wherein said cam surface of the recess receiving the resilient portion of a pivot pin comprises an annular surface.

5. A joint structure as set forth in claim 4 wherein the cam surface on said resilient fingers of said pivot pin comprises a conical segment.

6. A joint structure as set forth in claim 5 wherein each of said resilient fingers of said pivot pins extends parallel to said pivot axis, said annular surface of said cam surface of the recess extending at an acute angle relative to the pivot axis defined by the pivot pin and said conical segment of the cam surface associated with the pivot pin extending at an acute angle relative to the pivot axis.

7. A joint structure comprising first and second joint members connected together by a pivot pin forming a pivot axis about which said joint members pivot, each of said joint members having parallel juxtaposed surfaces extending perpendicular to said pivot axis, one of said juxtaposed surfaces having one or more detents and the other of said juxtaposed surfaces having one or more recesses adapted to receive and engage said detents, said pivot pin comprising a base portion fixedly connected with said first joint member and an integral resilient portion connected with said second joint member so as to allow said second member to pivot relative to said pivot pin, said integral resilient portion of said pivot pin comprising two or more integral resilient fingers, said resilient fingers serving to provide the only biasing force which urges said detents and recesses into engagement so as to adjustably retain said first and second joint members in a particular angular orientation until a predetermined torque is applied to said joint members which overcomes said biasing force and releases and disengages said detents and recesses allowing said joint members to pivot relative to said pivot axis.

8. A joint structure as set forth in claim 7 wherein said second joint member includes a recess having a cam surface circumscribing said pivot axis and said resilient fingers include a cam surface which also circumscribes said pivot axis, said cam surface of said resilient fingers and said cam surface of said recess cooperating to cause the resilient fingers to bend toward the pivot axis and create said biasing force when said first and second joint members are urged apart as said detents and recesses are positioned out of engagement upon application of the predetermined torque.

9. A joint structure as set forth in claim 8 wherein said base portion of said pivot pin is connected to said first joint member with a fastener.

10. A joint structure as set forth in claim 8 wherein one of said first and said second joint members comprises a primary piece and a secondary piece, said secondary piece comprising a detent pad upon which said detents are located.

11. A joint structure as set forth in claim 8 wherein one of said first and said second joint members comprises a primary piece and a secondary piece, said secondary piece comprising pad upon which said recesses are located.

12. A joint structure as set forth in claim 8 wherein said integral resilient portion of said pivot pin comprises four of said resilient fingers.

13. A joint structure as set forth in claim 12 wherein said cam surface of said pivot pin and said cam surface of said recess each extend at an angle of about thirty degrees relative to said pivot axis.

14. A joint structure as set forth in claim 13 wherein said cam surface of said pivot pin comprises a conical segment.

15. A joint structure as set forth in claim 14 wherein said conical segment extends at an angle of about thirty degrees relative to said pivot axis.

16. A joint structure comprising a first joint member, a second joint member, a pivot pin having a central longitudinal axis, and biasing means for providing a biasing force, said pivot pin extending between and pivotally connecting said joint members, each of said joint members having parallel juxtaposed surfaces extending perpendicular to said pivot pin, one of said juxtaposed surfaces having one or more detents and the other of said juxtaposed surfaces having one or more recesses adapted to receive and engage said detents, said pivot pin comprising a base portion fixedly connected to said first joint member and a resilient portion pivotally connecting said second joint member, said biasing force being the only force which serves to urge said detents and recesses into engagement and retain said first and second joint members in a particular angular orientation until a predetermined torque is applied to said joint members, said biasing force being formed entirely by said resilient portion which consists only of two or more integral resilient fingers.

17. A joint structure as set forth in claim 16 wherein said resilient fingers are formed in the proximity of one end of said pivot pin.

18. A joint structure as set forth in claim 17 wherein said resilient portion of said pivot pin comprises two or more integral resilient fingers and a cam surface and said second joint member includes a recess adapted to receive said resilient fingers, said recess having a cam surface, said cam surface of said recess and said cam surface of said pivot pin extending at an acute angle relative to said axis of said pivot pin.

19. A joint structure as set forth in claim 18 wherein said pivot pin comprises plastic.

20. A joint structure as set forth in claim 19 wherein said joint members both comprise plastic.

* * * * *

UNITED STATES PATENT AND TRADEMARK OFFICE
CERTIFICATE OF CORRECTION

PATENT NO. : 4,881,843

DATED : November 21, 1989

INVENTOR(S) : Randy J. Randleman

It is certified that error appears in the above-identified patent and that said Letters Patent is hereby corrected as shown below:

Column 6, line 57, please delete "n" and insert --in--.

Column 8, line 4, before "pad" please insert -- a recess--.

Signed and Sealed this

Nineteenth Day of March, 1991

Attest:

HARRY F. MANBECK, JR.

Attesting Officer

Commissioner of Patents and Trademarks